US012505953B2

(12) United States Patent
Wan et al.

(10) Patent No.: US 12,505,953 B2
(45) Date of Patent: Dec. 23, 2025

(54) DEVICE AND METHOD FOR MOLDING MAGNETIC POWDER

(71) Applicant: AAC Microtech (Changzhou) Co., Ltd., Jiangsu (CN)

(72) Inventors: Chunjing Wan, Changzhou (CN); Lin Qian, Changzhou (CN); Xueyuan Zhu, Changzhou (CN); Qihuan Zhu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 357 days.

(21) Appl. No.: 18/313,389

(22) Filed: May 8, 2023

(65) Prior Publication Data

US 2024/0194402 A1 Jun. 13, 2024

Related U.S. Application Data

(63) Continuation of application No. PCT/CN2023/085833, filed on Apr. 3, 2023.

(30) Foreign Application Priority Data

Dec. 13, 2022 (CN) ......................... 202211625287.8

(51) Int. Cl.

| | |
|---|---|
| ***H01F 41/02*** | (2006.01) |
| ***B22F 3/03*** | (2006.01) |
| ***H01F 1/08*** | (2006.01) |

(52) U.S. Cl.

CPC ............ *H01F 41/0266* (2013.01); *B22F 3/03* (2013.01); *H01F 1/08* (2013.01)

(58) Field of Classification Search

None

See application file for complete search history.

(56) References Cited

FOREIGN PATENT DOCUMENTS

CN 105562685 A * 5/2016 ................ B22F 3/03

* cited by examiner

*Primary Examiner* — Anthony M Liang

(74) *Attorney, Agent, or Firm* — Wiersch Law Group

(57) ABSTRACT

Provided are a device and method for molding magnetic powder. The device includes a frame, a mold lifting mechanism, a plate pressing mechanism, a punch mechanism and a height locking mechanism. The mold lifting mechanism includes a mold and a first driving member for moving the mold up and down. The plate pressing mechanism includes a pressing plate and a second driving member for moving the pressing plate up and down. The punch mechanism includes a punch and a third driving member for moving the punch up and down. The height locking mechanism includes a first locking piece for locking the pressing plate and a second locking piece for locking the punch. The mold reciprocates upward and downward, such that a filling density of the magnetic powder is kept uniform, and the density distribution difference of the magnetic powder in a height direction is reduced.

9 Claims, 3 Drawing Sheets

DEVICE AND METHOD FOR MOLDING MAGNETIC POWDER

TECHNICAL FIELD

The present disclosure relates to the technical field of powder molding, in particular to a device and method for molding magnetic powder.

BACKGROUND

At present, with the trend of high frequency and miniaturization of electronic components, the requirements for inductive components become more and more stringent, and the requirements for molding quality of magnetic powder of inductive components also become higher and higher.

At present, molding of the magnetic powder includes filling the magnetic powder into a molding cavity of the mold, and a punch extends into the molding cavity to apply a pressing force to the magnetic powder. During this process, the mold needs to vibrate up and down. Generally, the mold and the punch are driven by a cylinder to move upward, and height of the downward moving is set through a bumper structure. In this way, reciprocating motion is achieved. However, the precision of the height of the upward moving of the mold controlled by the cylinder cannot meet the process requirements.

SUMMARY

The present disclosure provides a device and a method for molding magnetic powder.

In an aspect, a device for molding magnetic powder is provided. The device includes: a frame, a mold lifting mechanism, a plate pressing mechanism, a punch mechanism, and a height locking mechanism. The mold lifting mechanism, the plate pressing mechanism, the punch mechanism, and the height locking mechanism are arranged on the frame. The mold lifting mechanism includes a mold, and a first driving member for driving the mold to move up and down, a top of the mold being provided with a molding cavity. The plate pressing mechanism moves up and down synchronously with the mold and includes a pressing plate, and a second driving member for driving the pressing plate to move up and down, and the pressing plate is provided with a through slot corresponding to the molding cavity. The punch mechanism includes a punch, and a third driving member for driving the punch to move up and down, the punch passing through the through slot and then extending into the molding cavity to form a molding fit. The height locking mechanism includes a first locking piece and a second locking piece, the first locking piece is configured to lock or unlock the pressing plate to lock a height position of the pressing plate, and the second locking piece is configured to lock or unlock the punch to lock a height position of the punch.

As an improvement, the frame includes a base, a first guiding rod and a top plate, and a bottom end of the first guiding rod is fixed to the base, and a top end of the first guiding rod is fixedly connected to the top plate.

As an improvement, the first driving member includes a first driving motor, a rotary disc and a roller, an end of an output shaft of the first driving motor is connected to the rotary disc, an axis of the rotary disc coincides with an axis of the output shaft of the first driving motor, and the roller is eccentrically arranged on a disc surface of the rotary disc. The mold includes a bottom plate, a mold body and a connecting plate, the mold body is fixed on the bottom plate, the bottom plate is guided by and fitted to the first guiding rod, a first end of the connecting plate is connected to the bottom plate, and a second end of the connecting plate abuts against the roller.

As an improvement, an encoding disc for indicating a rotation angle of the rotary disc is provided along a circumferential direction of the rotary disc.

As an improvement, the second driving member includes a first driving air cylinder, a second guiding rod and a first support, a bottom end of the second guiding rod is connected to the bottom plate, the first support is located above the mold, the first driving air cylinder is fixed on a top of the first support, a piston rod of the first driving air cylinder extends downward, an end of the piston rod of the first driving air cylinder is connected to a top of the second guiding rod, and the pressing plate is fixed on a bottom of the first support, and the pressing plate is guided and fitted on the second guiding rod.

As an improvement, the first driving air cylinder includes two first driving air cylinders spaced apart and parallel to each other, the second guiding rod includes two second guiding rods spaced apart and parallel to each other, and a position of the first driving air cylinder corresponds to a position of the second guiding rod.

As an improvement, the third driving member includes a first driving electric cylinder and a second support, the first support is provided with an accommodating space, and the second support is received in the accommodating space. The first driving electric cylinder is fixed on the top plate, the punch is fixed on a bottom of the second support, and an output shaft of the first driving electric cylinder extends downward and is connected to the punch by sequentially passing through the first support and the second support.

As an improvement, the third driving member further includes a third guiding rod which is fixed on the pressing plate, and the second support is guided by and fitted on the third guiding rod.

As an improvement, the first locking member is fixed on the first support, the second locking member is fixed on the second support, and the output shaft of the first driving electric cylinder sequentially passes through the first locking member and the second locking member.

In another aspect, a method for molding magnetic powder using the above device is provided. The method includes:

- S100: setting the mold at a given height;
- S101: driving the pressing plate by the second driving member to move down until the pressing plate tightly presses against the mold;
- S102: driving the punch by the third driving member to move down until the punch reaches to a specified height, and then fixing the punch at the specified height by the height locking mechanism;
- S103: driving the mold by the first driving member to move, with a predetermined speed, up to a predetermined height and down in a reciprocation manner;
- S104: moving the mold, the pressing plate and the punch to initial positions;
- S105: taking out a molded magnetic powder body in the mold.

According to the present disclosure, with the mold lifting mechanism and the height locking mechanism, reciprocates upward and downward, such that a filling density of the magnetic powder is kept uniform, and the density distribution difference of the magnetic powder in a height direction is reduced. Meanwhile, the lifting height is adjustable, and the pressing plate and the punch can be locked at any height.

REFERENCE SIGNS

- 10—frame, 11—base, 12—first guiding rod, 13—top plate, 14—reinforcing plate;
- 20—mold lifting mechanism, 21—mold, 211—bottom plate, 212—first through hole, 213—first sleeve, 214—mold body, 215—molding cavity, 216—connecting plate, 22—first driving motor, 23—rotary disc, 24—roller, 25—encoding disc;
- 30—plate pressing mechanism, 31—pressing plate, 32—first driving air cylinder, 33—second guiding rod, 34—first support, 35—second through hole, 36—second sleeve, 37—accommodating space;
- 40—punch mechanism, 41—punch, 42—first driving electric cylinder, 43—second support, 44—third guiding rod, 45—third through hole, 46—third sleeve;
- 50—height locking mechanism, 51—first locking piece, 52—second locking piece.

DETAILED DESCRIPTION OF EMBODIMENTS

The embodiments described below with reference to the figures are illustrative only for explaining the present disclosure and should not be construed as limiting the present disclosure.

Figure 1:
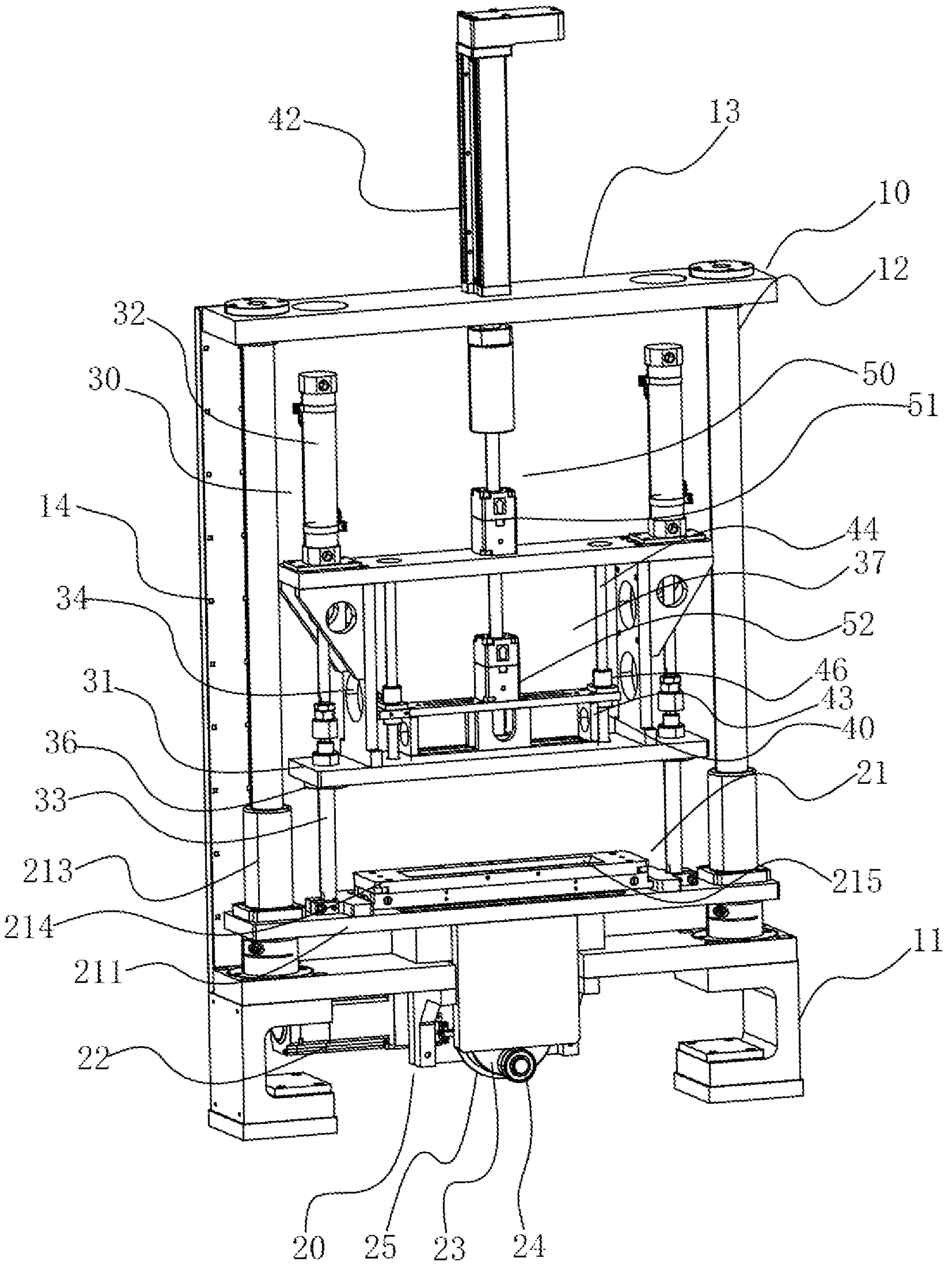
FIG. 1 is a perspective view of a device for molding magnetic powder according to the present disclosure.
Figure 2:
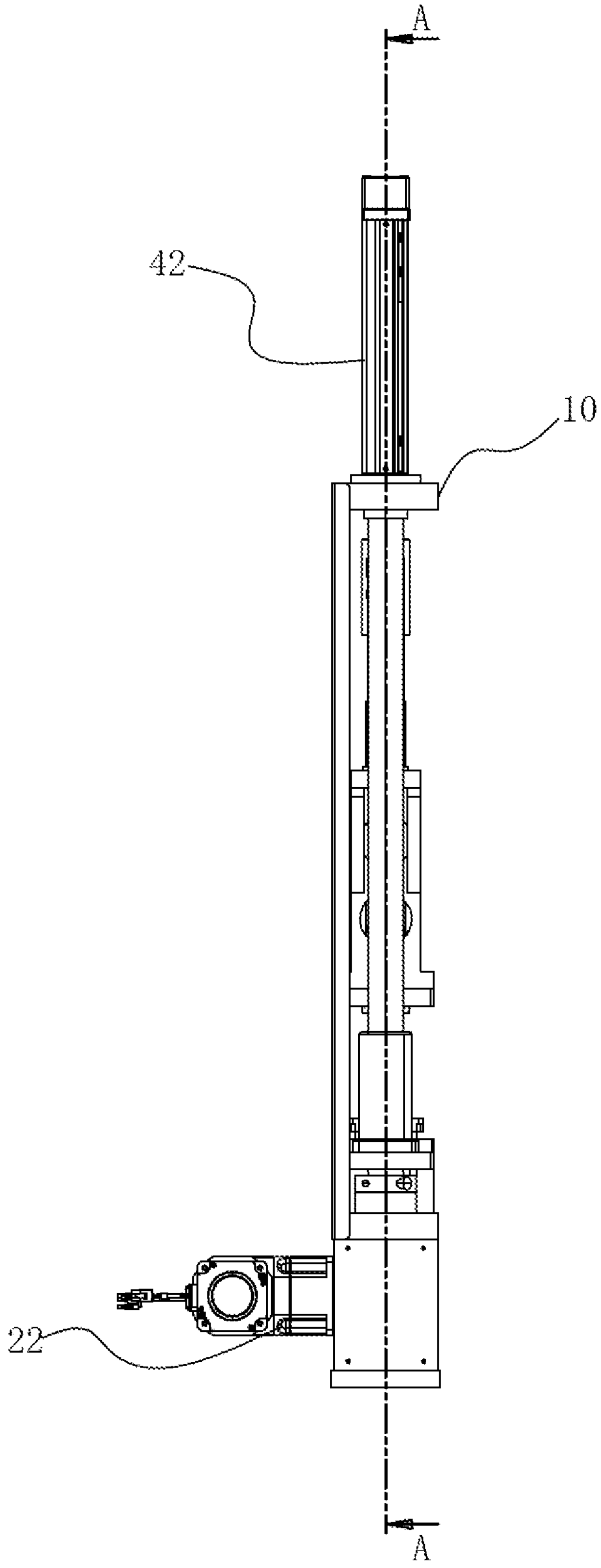
FIG. 2 is a side view of a device for molding magnetic powder according to the present disclosure.
Figure 3:
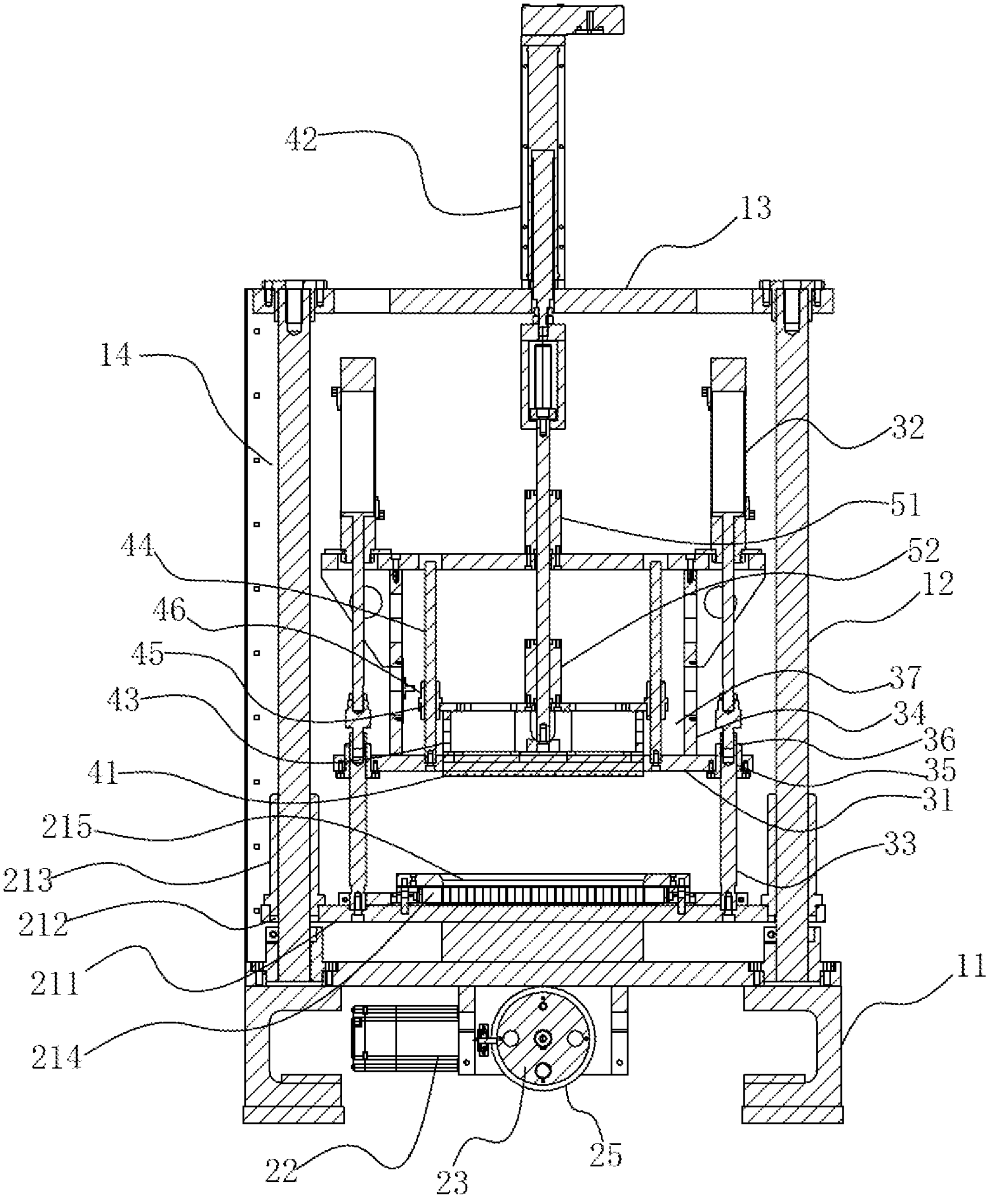
FIG. 3 is a sectional view of a device for molding magnetic powder taken along line AA of FIG. 2.

As shown in FIG. 1 to FIG. 3, embodiments of the present disclosure provide a device for molding magnetic powder. The device includes: a frame 10, a mold lifting mechanism 20, a pressing plate pressing mechanism 30, a punch mechanism 40 and a height locking mechanism 50. The mold lifting mechanism 20, the pressing plate pressing mechanism 30, the punch mechanism 40 and the height locking mechanism 50 are arranged on the frame 10.

The mold lifting mechanism 20 includes a mold 21 and a first driving member for driving the mold 21 to move up and down. A molding cavity 215 is formed at a top of the mold 21, and magnetic powder is filled in the molding cavity 215 to form a magnetic powder body. The first driving member can drive the mold 21 moves up and down in a reciprocation manner, such that the filling density of the magnetic powder is kept uniform, and the density distribution difference of the magnetic powder in a height direction can be reduced.

The plate pressing mechanism 30 moves up and down synchronously with the up-and-down movement of the mold 21. The plate pressing mechanism 30 includes a pressing plate 31 and a second driving member for driving the pressing plate 31 to move up and down. The plate pressing mechanism 30 is located above the mold lifting mechanism 20. After the pressing plate 31 is lowered to a specified height, a bottom of the pressing plate 31 is pressed against a top of the mold 21, and a bottom surface of the pressing plate 31 is in contact with a top surface of the mold 21. When the first driving member drives the mold 21 to move up and down, the pressing plate 31 moves up and down together with the mold 21. The pressing plate 31 is provided with a through slot corresponding to the molding cavity 215. The through slot is located above the molding cavity 215. An inner diameter of the through slot is greater than an inner diameter of the molding cavity 215.

The punch mechanism 40 includes a punch 41 and a third driving member that drives the punch 41 to move up and down. The punch mechanism 40 is located above the plate pressing mechanism 30. In an initial state, the punch 41 is located above the pressing plate 31. An outer contour surface of the punch 41 matches an inner contour surface of the molding cavity 215. After the pressing plate 31 is pressed against the mold 21, the punch 41 is lowered to a specified height by the third driving member.

The height locking mechanism 50 includes a first locking member 51 and a second locking member 52. The first locking member 51 is configured to lock or unlock the pressing plate 31 such that the pressing plate 31 can be locked at any height. The second locking member 52 is configured to lock or unlock the punch 41, such that the punch 41 can be locked at any height.

In the present disclosure, with the mold lifting mechanism 20 and the height locking mechanism 50, the mold 21 moves up and down in a reciprocation manner, such that the filling density of the magnetic powder is kept uniform, and the density distribution difference of the magnetic powder in the height direction is reduced. Meanwhile, the moving height of the mold 21 can be adjusted, and the pressing plate 31 and the punch 41 can be locked at any height.

In the embodiments provided by the disclosure, as shown in FIG. 1 and FIG. 3, the frame 10 includes a base 11, a first guiding rod 12 and a top plate 13. Two first guiding rods 12 are provided, and the two first guiding rods 12 are arranged in parallel. The first guiding rod 12 extends along the direction of gravity. A bottom end of the first guiding rod 12 is fixed to the base 11, and a top end of the first guiding rod 12 is fixedly connected to the top plate 13. A reinforcing plate 14 is provided between the top plate 13 and the base 11, and two ends of the reinforcing plate 14 are connected to the top plate 13 and the base 11 respectively to strengthen the overall strength of the frame 10.

Referring to FIG. 1, the first driving member includes a first driving motor 22, a rotary disc 23 and a roller 24. The first driving motor 22 is fixed on the base 11 by a motor holder, and an output shaft of the first driving motor 22 extends along a horizontal direction. An end of the output shaft of the first driving motor 22 is connected to the rotary disc 23, and an axis of the rotary disc 23 coincides with an axis of the output shaft of the first driving motor 22. The roller 24 is eccentrically arranged on the surface of the rotary disc 23.

With reference to shown in FIG. 3, the mold 21 includes a bottom plate 211, a mold body 214 and a connecting plate 216. The molding cavity 215 is disposed in the mold body 214. The mold body 214 is fixed on the bottom plate 211, and the bottom plate 211 is provided with a first through hole 212 at a position corresponding to the first guiding rod 12. A first sleeve 213 is fixed in the first through hole 212. The first guiding rod 12 is fitted in the first sleeve 213 with a gap relative to the first sleeve 213. In this way, the bottom plate 211 is guided by and fitted with the first guiding rod 12. One end of the connection plate 216 is connected to the bottom plate 211, and another end of the connection plate 216 abuts against the roller 24. The first driving motor 22 drives the rotary disc 23 to rotate. Since the connection plate 216 is always pressed against the roller 24, the driving force is transmitted to the connecting plate 216 via the roller 24, thereby driving the mold body 214 to reciprocate up and down.

In some embodiments of the present disclosure, as shown in FIG. 1 and FIG. 3, the rotary disc 23 is provided with an encoding disc 25 in the circumferential direction of the rotary disc for measuring the rotation angle of the rotary disc 23. In some embodiments, notches are annually arranged on a surface of the encoding disc 25 and spaced apart from one another. A light source on a side of the encoding disc 25 emits light, and a photoelectric conversion device on the other side of the encoding disc 25 receives the light and converts it into a corresponding electrical signal. In this way, a rotation angle of the encoding disc 25 is calculated, and then a height of the mold body 214 moved up or down can be obtained.

In some embodiments of the disclosure, as shown in FIG. 1 and FIG. 3, the second driving member includes a first driving air cylinder 32, a second guiding rod 33 and a first support 34. A bottom end of the second guiding rod 33 is connected to the bottom plate 211. The first support 34 is located above the mold 21. A cylinder body of the first driving air cylinder 32 is fixed on a top of the first support 34. A piston rod of the first driving air cylinder 32 extends downward, and an end of the piston rod of the first driving air cylinder 32 is connected to a top of the second guiding rod 33 through a coupling. The pressing plate 31 is fixed at a bottom of the first support 34. The pressing plate 31 is provided with a second through hole 35 at a position corresponding to the second guiding rod 33, and a second sleeve 36 is fixed in the second through hole 35. The second guiding rod 33 is fitted in the second sleeve 36 with a gap relative to the second sleeve 36. In this way, the pressing plate 31 is guided by and fitted with the second guiding rod 33.

When the first driving air cylinder 32 operates, the piston rod of the first driving air cylinder 32 reciprocates forth and back. Since the end of the piston rod of the first driving air cylinder 32 is fixedly connected to the first guiding rod 12 and the cylinder body of the first driving air cylinder 32 is fixed on the first support 34, the first support 34 is driven to move up and down, and the pressing plate 31 is driven to move up and down accordingly.

Further, two first driving air cylinders 32 and two second guiding rods 33 are provided, the two first driving air cylinders 32 are arranged in parallel and spaced apart from each other, and the two second guiding rods 33 are arranged in parallel and spaced apart from each other. A position of the first driving air cylinder 32 corresponds to a position of the second guiding rod 33, such that a uniform and stable pressing force is applied to the pressing plate 31, and the pressing plate 31 maintains a horizontal state during the lowering process.

In an embodiment of the present disclosure, the third driving member includes a first driving electric cylinder 42 and a second support 43. The first support 34 is a skeletal structure, and an accommodating space 37 is formed in the first support 34. The second support 43 is accommodated in the accommodating space 37. The first driving electric cylinder 42 is fixed on the top plate 13, and the output shaft of the first driving electric cylinder 42 extends downward. The first support 34 and the second support 43 are both arranged below the first driving electric cylinder 42. The punch 41 is fixed to the bottom of the second support 43. The output shaft of the first driving electric cylinder 42 extends downward, passes through the first support 34 and the second support 43 successively, and then is connected to the punch 41. When the first driving electric cylinder 42 work, the punch 41 is driven to move up and down.

Further, the third driving member further includes a third guiding rod 44, and the third guiding rod 44 is fixed to the pressing plate 31. The third guiding rod 44 extends along the direction of gravity. The first support 34 is provided with a through hole at a position corresponding to the third guiding rod 44 to avoid affecting to the up-and-down movement of the third guiding rod 44. The second support 43 is provided with a third through hole 45 at a position corresponding to the third guiding rod 44, and a third sleeve 46 is fixed in the third through hole 45. The third guiding rod 44 is fitted in the third sleeve 46 with a gap relative to the third sleeve 46. In this way, the second support 43 is guided by and fitted to the third guiding rod 44, such that the punch 41 maintains a horizontal state during the lowering process.

In an embodiment of the disclosure, the first locking member 51 is fixed on the first support 34, the second locking member 52 is fixed on the second support 43, and the output shaft of the first electric driving cylinder 42 sequentially passes through the first locking member 51 and the second locking member 52. In an embodiment, both the first locking member 51 and the second locking member 52 employ a pneumatic locking device. For the structure of the pneumatic locking device, reference can be made to existing art and are described in detail here, as long as the locking device is able to lock and release the first support 34 and the second support 43.

Based on the device for molding magnetic powder in the above embodiments, the present disclosure also provides a method for molding magnetic powder. The method includes the following steps.

At S100: the mold 21 is set at a given height.

At S101: the second driving member drives the pressing plate 31 to move down until the pressing plate presses against the mold 21 tightly.

At S102: the third driving member drives the punch 41 to move down until the punch 41 is lowered to a specified height, and then the height locking mechanism 50 locks the punch 41 at the specified height.

At S103: the first driving member drives the mold 21 to move, with a predetermined speed, up to a predetermined height and down in the reciprocation manner.

At S104: the mold 21, the pressing plate 31 and the punch 41 return to initial positions, At S105: the molded magnetic powder body in the mold 21 is taken out, and the process is complete.

In the method for molding magnetic powder, the mold can be driven to reciprocate up and down, such that a filling density of the magnetic powder is kept uniform, and the density distribution difference of the magnetic powder in a height direction is reduced. Meanwhile, the lifting height of the mold is adjustable, and the pressing plate and the punch can be locked at any height.

The structure, features and effects according to the present disclosure have been described in detail in the embodiments with reference to the drawings. The above descriptions are only preferred embodiments of the present disclosure, but the implementation of the present disclosure should not be limited by the drawings. Changes made based on the concept of the present disclosure or modifications to equivalent embodiments without departing from the spirit of the present disclosure should fall within the protection scope of the present disclosure.

What is claimed is:

1. A magnetic powder molding device comprising: a frame, a mold lifting mechanism, a plate pressing mechanism, a punch mechanism, and a height locking mechanism, wherein the mold lifting mechanism, the plate pressing mechanism, the punch mechanism, and the height locking mechanism are arranged on the frame, the mold lifting mechanism comprises a mold, and a first driving member for driving the mold to move up and down, a top of the mold being provided with a molding cavity, the plate pressing mechanism moves up and down synchronously with the mold, and the plate pressing mechanism comprises a pressing plate, and a second driving member for driving the pressing plate to move up and down, the pressing plate is provided with a through slot corresponding to the molding cavity, the punch mechanism comprises a punch, and a third driving member for driving the punch to move up and down, the punch passing through the through slot and then extending into the molding cavity to form a molding fit, and the height locking mechanism comprises a first locking piece and a second locking piece, the first locking piece is configured to lock or unlock the pressing plate to lock a height position of the pressing plate, and the second locking piece is configured to lock or unlock the punch to lock a height position of the punch.

2. The magnetic powder molding device according to claim 1, wherein the frame comprises a base, a first guiding rod and a top plate, and wherein a bottom end of the first guiding rod is fixed to the base, and a top end of the first guiding rod is fixedly connected to the top plate.

3. The magnetic powder molding device according to claim 2, wherein the first driving member comprises a first driving motor, a rotary disc and a roller, wherein an end of an output shaft of the first driving motor is connected to the rotary disc, and an axis of the rotary disc coincides with an axis of the output shaft of the first driving motor, and the roller is eccentrically arranged on a disc surface of the rotary disc, the mold comprises a bottom plate, a mold body and a connecting plate, wherein the mold body is fixed on the bottom plate, the bottom plate is guided by and fitted to the first guiding rod, a first end of the connecting plate is connected to the bottom plate, and a second end of the connecting plate abuts against the roller.

4. The magnetic powder molding device according to claim 3, wherein an encoding disc for indicating a rotation angle of the rotary disc is provided along a circumferential direction of the rotary disc.

5. The magnetic powder molding device according to claim 3, wherein the second driving member comprises a first driving air cylinder, a second guiding rod and a first support, wherein a bottom end of the second guiding rod is connected to the bottom plate, the first support is located above the mold, the first driving air cylinder is fixed on a top of the first support, a piston rod of the first driving air cylinder extends downward, an end of the piston rod of the first driving air cylinder is connected to a top of the second guiding rod, and the pressing plate is fixed on a bottom of the first support, and the pressing plate is guided and fitted on the second guiding rod.

6. The magnetic powder molding device according to claim 5, wherein the third driving member comprises a first driving electric cylinder and a second support, the first support is provided with an accommodating space, and the second support is received in the accommodating space, and the first driving electric cylinder is fixed on the top plate, the punch is fixed on a bottom of the second support, and an output shaft of the first driving electric cylinder extends downward and is connected to the punch by sequentially passing through the first support and the second support.

7. The magnetic powder molding device according to claim 6, wherein the third driving member further comprises a third guiding rod which is fixed on the pressing plate, and the second support is guided by and fitted on the third guiding rod.

8. The magnetic powder molding device according to claim 6, wherein the first locking piece is fixed on the first support, the second locking piece is fixed on the second support, and the output shaft of the first driving electric cylinder sequentially passes through the first locking piece and the second locking piece.

9. A method for molding magnetic powder using the device according to claim 1, comprising:

S100: setting the mold at a given height;

S101: driving the pressing plate by the second driving member to move down until the pressing plate tightly presses against the mold;

S102: driving the punch by the third driving member to move down until the punch reaches to a specified height, and then fixing the punch at the specified height by the height locking mechanism;

S103: driving the mold by the first driving member to move, with a predetermined speed, up to a predetermined height and down in a reciprocal manner;

S104: moving the mold, the pressing plate and the punch to initial positions;

S105: taking out a molded magnetic powder body in the mold.

* * * * *